INVENTOR.
Norman J. Anderson
BY
James A. Eisenman
ATTORNEY

United States Patent Office 3,417,338
Patented Dec. 17, 1968

3,417,338
PHASE-SENSITIVE GATED SWITCHING MEANS
Norman J. Anderson, Boonton, N.J., assignor to North Atlantic Industries, Inc., Plainview, N.Y., a corporation of New York
Continuation of application Ser. No. 334,817, Dec. 31, 1963. This application May 15, 1967, Ser. No. 638,669
8 Claims. (Cl. 329—132)

ABSTRACT OF THE DISCLOSURE

A signal gating circuit for gating a signal to a load in synchronism with another signal, such as a reference signal, making possible phase sensitive modulation or demodulation. The reference signal is preferably a constant current source and the signal feedback is provided around the gating means.

---

Figure 1:
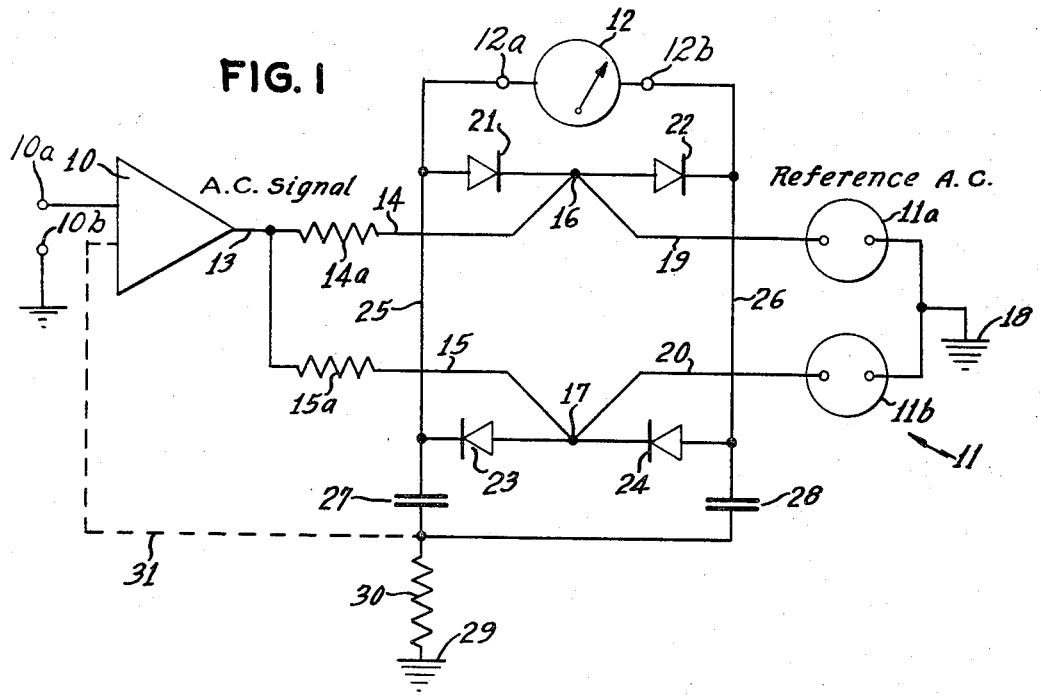

This application is a continuation of Ser. No. 334,817, filed Dec. 31, 1963, and now abandoned.

This invention relates to modulators and demodulators, particularly phase-sensitive types. Broadly, the invention relates to gated switching circuitry for modulating or demodulating signals in a highly efficient manner. A specific embodiment of the invention is a phase-sensitive demodulator capable of producing a D-C signal having a magnitude proportional to the product of the amplitude of an A-C signal and the cosine of the phase angle of the A-C signal with respect to an A-C reference signal.

Phase-sensitive demodulator circuits are used typically in measuring instruments such as phase-sensitive voltmeters and in systems such as phase-sensitive converters. In demodulator systems in which the reference signal is introduced through a transformer to operate gating circuits for rectifying the A-C signal, the demodulator suffers from the inherent inefficiencies including the frequency limitations and distortions of the transformer. Also, impedances in the signal circuit characteristically divert D-C power from the meter or load and the efficiency and sensitivity are therefore reduced. Also, the impedance of the A-C reference source can load the signal source. Further, the bulk capacitance of the meter across the load, as is characteristic of conventional phase-sensitive demodulator circuits, affects the accuracy of the output reading.

Accordingly, it is an object of the present invention to provide a new and improved phase-sensitive demodulator for use in phase-sensitive equipment which overcomes the above disadvantages of conventional circuits.

Another object of the invention is to provide a phase-sensitive demodulator which is capable of operation without a transformer input for the A-C reference signal.

In accordance with the present invention there is provided a phase-sensitive demodulator for producing a D-C output of magnitude proportional to the product of the amplitude of the A-C input signal and the cosine of the phase angle of said input signal with respect to an A-C reference signal. An A-C signal source to be measured is connected through a pair of signal conductors, each including an approximately equal impedance and connected to the two terminals of an A-C reference source, the latter preferably in the form of a constant current source such as a pair of constant current amplifiers operating 180° out of phase. A full-wave rectifying ring demodulator circuit is connected across the two conductors or signal lines and the meter is connected across the bridge. The two terminals of the meter are also connected to ground through a pair of impedance elements which can take the form of capacitors. In this fashion the diodes of the full-wave rectifier are gated by the reference signal and the rectified signal output will be directly proportional to the in-phase component of the signal. If desired, the two terminals of the meter, also representing terminals of the demodulator, can be grounded through a feedback resistor to derive a feedback signal for the A-C signal source, which can take the form of an A-C amplifier.

Figure 2:
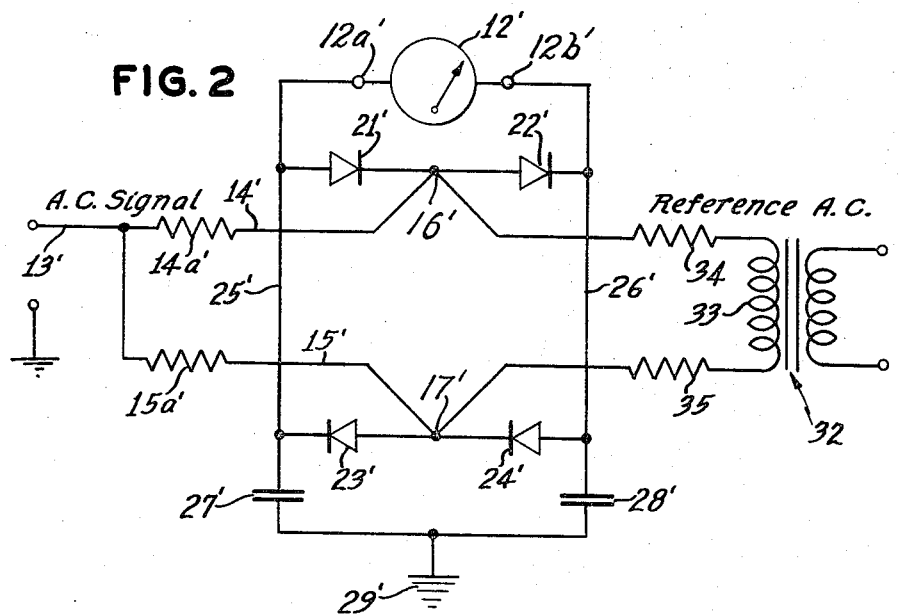

The above and other features and the advantages of the present invention will be apparent having reference to the following specification taken in conjunction with the accompanying drawings in which:

FIGURE 1 is a simplified circuit diagram of one preferred full-wave demodulator circuit useful in a phase-sensitive voltmeter or converter; and FIGURE 2 is a simplified diagram of a modified demodulator circuit.

Referring to FIGURE 1, there is illustrated a demodulator or detector circuit which is particularly useful in phase-sensitive voltmeters, phase-sensitive converters, or, broadly speaking, as part of a system for producing a D-C output having a magnitude precisely proportional to the product of the amplitude of an A-C input signal and the cosine of the phase angle of the A-C input signal with respect to an A-C reference signal of the same frequency. To this end the phase-sensitive demodulator circuit of FIGURE 1 is fed by an A-C signal input channel which can take the form of a signal amplifier 10 having terminals 10a and 10b representing input terminals to the overall circuit and by an A-C reference signal source 11 in the form of a pair of constant current sources 11a and 11b operated in series 180° out of phase. The output of the demodulator circuit is represented by a meter 12 having terminals 12a and 12b.

The output of the signal channel amplifier 10 appearing in a conductor 13 is divided into two parallel circuits 14 and 15, including approximately equal impedances 14a and 15a, respectively, and connected to junctions 16 and 17, respectively. The constant current sources 11a and 11b having a common ground connection 18 are, respectively, connected to the junctions 16 and 17 by conductors 19 and 20.

A pair of gating devices, such for example as diodes 21 and 23, are connected in series across the junctions 16 and 17 polarized to form a current path in one direction, and a second pair of diodes 22 and 24 are also connected across the junctions to form a current path in the opposite direction, to form a ring demodulator circuit in which the meter 12 is connected across the other pair of junctions.

Two junctions of the demodulator and the meter are connected to ground at 29 through a pair of conductors 25 and 26, including, respectively, impedance elements 27 and 28, preferably taking the form of capacitors, and by a series resistor 30. The series resistor 30 can be used to derive a feedback voltage and to this end its ungrounded end can be connected by means of a conductor 31 (shown in broken lines) to the input of the amplifier 10 at an appropriate point in the amplifier to afford negative feedback 31. The resistor 30 and feedback connection 31 can, if desired, be omitted. In such case, linearity in the system can be obtained by utilizing a signal amplifier embodying a load current sampling or measuring circuit of the type disclosed in the applicant's co-pending application Ser. No. 334,847, filed Dec. 31, 1963. Each of the constant current A-C reference sources 11a and 11b can likewise take the form of an amplifier circuit having grounded load current measuring or sampling in accordance with said co-pending application.

In operation, assuming for purposes of explanation that a steady state condition obtains, the A-C signal from the source 10 is divided into two circuits and impressed on the junctions 16 and 17. The diodes 22 and 24 operate as a first set of gates or switches in series with the reference A-C sources 11a and 11b and the diodes 21 and 23 operate as a second set. The switching or gating means 21, 22, 23 and 24 are controlled by the level of the reference current so that the signal current is insufficient to operate the gates. The magnitude of the A-C reference signal is sufficiently large relative to the A-C signal current, so that for a major portion of each reference signal cycle one or the other said sets of gating means is conducting. Assuming the A-C signal and the reference A-C signal are in phase, and a positive half-cycle is being generated by the source 11a and a negative half-cycle by the source 11b, current will flow from the source 11a through the conductor 19 and junction 16 to the diode 22 through the diode and the conductor 26 through the diode 24 to the junction 17 and through the conductor 20 to the constant current source 11b. With the diodes 22 and 24 conducting, positive signal current will flow from the source 10 through both diodes to increase the steady-state positive charge then existing on the capacitor 28. Current will also flow through the meter 12 and to ground through capacitor 27, decreasing the then existing negative charge therein.

Upon reversal of the A-C reference source to negative signal current the gating means 23 and 21 will conduct, completing a circuit, including the source 11b, conductor 20, junction 17, diode 23, diode 21, junction 16 and conductor 19, and the source 11a. Signal current, now in its negative half-cycle, will flow through the set of diodes 21 and 23 to change the charges onto the capacitors 27 and 28 in the opposite directions with respect to the positive signal current described previously. A portion of the current will also flow down from ground 29 through the resistor 30, the impedance element 28, conductor 26, the meter 12 and the conducting diodes 21 and 23, to the junctions 16 and 17 from which it flows to the source 10 through conductors 14 and 15 and impedances 14a and 15a. The other portion of the current will also flow from ground through the capacitor 27 where it combines in the conductor 25 with that portion of the current which flows through the meter 12 prior to flowing through diodes 21 and 23. Thus the process of full-wave rectification occurs involving a combination of signal current through the meter and capacitor charge and discharge. Demodulation efficiency involves the magnitude of the meter impedance or load and the nature of the impedance elements 27 and 28. High efficiency over a large band-width obtains from the use of capacitors as the impedance elements 27 and 28.

If there is a 90° phase reltionship between the A-C signal and the A-C reference signal, the current through the meter 12 will be zero by virtue of the switching action of the gating means between half-cycles of reference current. For each full-cycle of the A-C signal, therefore, as much curent will flow through the meter in one direction as flows through the meter in the opposite direction and the meter will be nulled. As the phase relationship between the A-C signal and the A-C reference signal approaches the 180° point, all of the current will be flowing in the opposite direction through the meter 12 and full-scale reading in the opposite direction will obtain.

In the event the impedance elements 27 and 28 are resistors, it is desirable, for efficiency, that the impedance of the meter 12 below relative to that of the impedance elements 27 and 28. In the preferred embodiment of the invention, however, the impedance elements 27 and 28 take the form of capacitors, in which case the impedance of the meter 12 can be relatively high while still realizing maximum rectification efficiency.

Feedback is preferably used in the above circuit to improve the inherent nonlinear characteristics of diodes in the gated-on position and also to improve the balance of the gate circuitry and its driving means, i.e. the constant current sources 11a and 11b. It also improves the balance between the impedances 14a and 15a. Feedback current is derived from the ungrounded end of the resistor 30 due to the fact that virtually all of the output current of the amplifier 10, although dividing within the demodulater circuit, passes through the resistor 30. A directly proportional part of this current passes through the meter 12. In a practical circuit a small current loss occurs in the reference A-C source. For this reason, constant current sources having inherently high impedances are utilized to minimize this loss.

The net effect of the 180° or negative feedback loop is to cause the current flowing through the resistor 30 (and therefore the meter 12 with respect to its directly proportional part) to be an exact replica of the A-C signal introduced into the amplifier.

Referring to FIGURE 2, there is illustrated a modification of the invention in which a circuit configuration generally similar to that of FIGURE 1 is utilized and in which like parts and components are identified by like, primed reference numerals. In this circuit arrangement the impedance elements 27' and 28' are connected directly to ground at 29' and the A-C reference source comprises a transformer 32 having its primary winding connected to a reference signal amplifier (not shown) and having opposite terminals of its secondary winding 33 connected, respectively, to the junctions 16' and 17' through circuits, including matched impedances 34 and 35 of relatively high value. The operation of the circuit is the same as that described above having reference to FIGURE 1.

In a typical circuit of the type shown in FIGURE 1 the resistors 14a and 15a were 6.8K ohms and the four diodes were type 1N252. Small series resistances of the order of 510 ohms were included in series with each diode and the capacitors 27 and 28 were .47 microfarad. The meter impedance was 4.7K ohms.

While the invention has been described having reference to preferred embodiments thereof, it will be understood that it can take various forms and arrangements without departing from the scope of the invention. Thus, for example, the signal source 10 and the feedback resistor 30 of FIGURE 1 can be interchanged without altering the primary circuit function, using capacitors 27 and 28 as shown connected to the meter terminals. Further, the circuit of FIGURES 1 and 2 can be used as a modulator to modulate a D-C or low-frequency modulated D-C source by substituting an output load for the meter 12 and introducing the signal to be modulated through the input 13, and the A-C reference signal source can be any periodic signal such as an A-C sine wave or a square wave or a train of periodic pulses. Also, it will be understood if the demodulator circuit is to be utilized as a phase-sensitive converter, an impedance element can be used in place of the meter 12. The invention should not, therefore, be regarded as limited except as defined by the following claims.

I claim:

1. Phase-sensitive, gated switching means for modulating, demodulating and the like, comprising: a pair of signal input terminals and a pair of signal output terminals; load means connected across said signal output terminals; a pair of capacitances connected in series across the output terminals, whereby there is established a shunt path, including the two capacitances, across the signal output terminals and therefore across the load; means to connect the junction between the capacitances to one of the input terminals; an A-C reference signal source; gated switching means connected to the A-C reference source to be actuated thereby; conductive means connecting said gated switching means to the other of said input signal terminals; and conductive means connecting the gated switching means to each of said signal output terminals; said gated switching means including means to connect the other of said signal input terminals alternately to opposite sides of said load means through the output terminals.

2. The invention as set forth in claim 1 including an amplifier to provide an input signal; the amplifier having a pair of input terminals; a feedback terminal and a pair of output terminals, means connecting the amplifier output terminals to the said pair of signal input terminals; signal-developing means connected between one of the output terminals of the amplifier and one of the signal input terminals; said feedback means to connect the signals from the signal-developing means to said feedback terminal of the amplifier.

3. The invention set forth in claim 1, said A-C reference source for operating the gated switching means comprising a push-pull constant current source; and means to connect the constant current source to the gated switching means.

4. Phase-sensitive, gated switching means for modulating, demodulating and the like, comprising: a pair of signal input terminals and a pair of signal output terminals; load means connected across said signal output terminals; a first pair of impedances connected in series across the output terminals, whereby there is established a shunt path, including the first pair of impedances, across the signal output terminals and therefore across the load; means to connect the junction between the impedances to one of the input terminals; an A-C reference signal source; a ring demodulator having two pairs of diagonal terminals; means to connect the signal output terminals to one pair of ring demodulator diagonal terminals; means to connect the reference source across the second pair of ring demodulator diagonal terminals; a second pair of impedances series-connected across the second pair of ring demodulator diagonal terminals; and means connecting the other signal input terminal to the junction between said second pair of impedances.

5. The invention set forth in claim 4, one of said pair of impedances comprising capacitors.

6. The invention set forth in claim 4, including an amplifier to provide an input signal, the amplifier having a pair of input terminals; a feedback terminal and a pair of output terminals, means connecting the amplifier output terminals to the said pair of signal input terminals; signal-developing means connected between one of the output terminals of the amplifier and one of said signal input terminals; and feedback means including means to connect the signals from the signal-developing means to said feedback terminal of the amplifier.

7. The invention set forth in claim 6, one of the output terminals of the amplifier being grounded, one of said pair of impedances comprising capacitances, said signal-developing means comprising a resistor having one end connected to ground and the other end connected to the said input signal terminal which is connected to said pair of capacitances.

8. The invention set forth in claim 7, said A-C reference source comprising a push-pull constant current source.

References Cited

UNITED STATES PATENTS

| 2,875,404 | 2/1959 | Handel | 324—87 |
| 2,945,950 | 7/1960 | Midkiff. | |
| 3,029,386 | 4/1962 | Ricker | 324—87 |

FOREIGN PATENTS 888,133    8/1953   Germany.

RUDOLPH V. ROLINEC, *Primary Examiner.*

P. F. WILLE, *Assistant Examiner.*

U.S. Cl. X.R.

324—87; 332—47